Patented Feb. 23, 1954

2,670,387

UNITED STATES PATENT OFFICE

2,670,387

FLUORINATION OF TRIFLUORO-TRICHLORO-PROPENE

Hans B. Gottlieb, Glassboro, N. J., and Joseph D. Park, Boulder, Colo., assignors to E. I. du Pont de Nemours & Company, Wilmington, Del., a corporation of Delaware No Drawing. Application April 29, 1949, Serial No. 90,566

8 Claims. (Cl. 260—653)

This invention relates to the fluorination of 1:1:1 - trifluoro-2:3:3-trichloro-2-propene and particularly to the preparation of 2:3:3-trichloropentafluoropropane and 2:3-dichlorohexafluoropropane.

The compounds $CF_3—CClF—CCl_2F$ and $$CF_3—CClF—CClF_2$$

are useful as heat transfer media, solvents, reaction media, dielectric materials and as intermediates in the manufacture of refrigerants. However, they are particularly valuable as intermediates for the manufacture of $$CF_3—CF\!=\!CClF$$

and $CF_3—CF\!=\!CF_2$ by dechlorination which latter compounds may be polymerized to form valuable polymeric materials. Also, $$CF_3—CClF—CCl_2F$$

may be readily converted to $CF_3—CClF—CClF_2$ by treatment with HF by well known methods.

Prior methods for adding fluorine to the double bonds of olefinic compounds have certain disadvantages. The use of $PbO_2$ or $Co_2O_3$ and HF require the use of high pressures, refrigeration, liquid phase and limited batch processes and are difficult to control and result in relatively low yield.

McBee et al., in Industrial and Engineering Chemistry, vol. 39, No. 3, March 1947, pages 310 to 313, disclose that polychloropolyfluoroheptenes can be fluorinated by passing vapors thereof over $CoF_3$. They found that chlorine was replaced by fluorine at the lower temperatures and that high temperatures of about 350° C. to 400° C. were required to obtain substantial saturation of the double bonds by fluorine, at the same time obtaining substantially complete replacement of chlorine by fluorine.

It is an object of the present invention to provide a simple, economical and readily controlled process for adding fluorine to the double bond of 1:1:1-trifluoro-2:3:3-trichloro-2-propene and obtain technically valuable products in improved yields. Another object is to provide such a method which avoids substitution of a material proportion of chlorine by fluorine, i. e., over fluorination. A further object is to provide such a process which produces 2:3:3-trichloropentafluoropropane as the main product. Still another object is to provide such a process which will produce 2:3-dichlorohexafluoropropane directly and as the main product. Other objects are to advance the art. Still other objects will appear hereinafter.

The above and other objects may be accomplished in accordance with our invention which comprises passing a mixture of vapors of 1:1:1-trifluoro-2:3:3-trichloro-2-propene and an inert gas, which mixture contains from about 3% to about 50% by weight of the trifluoro-trichloropropene, over powdered $CoF_3$ heated at a temperature of from about 50° C. to about 150° C. at a contact time of from about 1 to about 10 minutes while stirring the powdered $CoF_3$ to continuously expose fresh surfaces thereof to the mixture of gases and then separating the products.

We have found that, by such process, we can obtain high yields of 2:3:3-trichloropentafluoropropane and 2:3-dichlorohexafluoropropane as the main products and avoid the production of substantial amounts of more highly fluorinated products and polymers. Such process avoids the objectionable features of the prior processes and is simple and economical to operate. The reactions take place smoothly and the process is readily controlled. The yield of saturated products is much higher than has been obtained by prior processes.

Apparatus for carrying out reactions of this character are well known. It ordinarily comprises some means for mixing vapors of the organic material to be treated with the inert gas and then passing the mixture of gases through a horizontal cylindrical reactor, containing a bed of the solid fluorinating agent and provided with means for agitating the solid fluorinating agent, and traps or condensers for collecting the products of the reaction. The reactor for use in our process may suitably be made of steel or of an alloy having the composition 60–70% Ni, 25–35% Cu, 1–3% Fe, 0.25–2.0% Mn, 0.02–1.5% Si and 0.3–0.5% C. and which is generally known to the art as "Monel."

The process should be carried out at temperatures of from about 50° C. to about 150° C. At temperatures materially below 50° C., the reaction tends to be too slow and the yields too low to be practicable. At temperatures materially above 150° C., there is a tendency toward over fluorination and hence the production of compounds not desired at the expense of the desired compounds. Within the range of 50° C. to 150° C., the lower temperatures favor the conversion to $CF_3—CClF—CCl_2F$, whereas, the higher temperatures and longer contact times favor the conversion to $CF_3—CClF—CClF_2$. Generally, temperatures of from about 50° C. to about 115° C. produce $CF_3—CClF—CCl_2F$ as the main product with optimum conversions at temperatures of from 50° C. to about 80° C. At temperatures above 115° C., $CF_3$—$CClF$—$CClF_2$ will usually constitute the main product, particularly with the longer contact times, with optimum conversions at about 150° C.

The contact times may vary from about 1 minute to about 10 minutes. At contact times materially below 1 minute, the yields will usually be too low to be practicable. With contact times materially above 10 minutes, there is a tendency for over fluorination with decrease in yield of the desired products. Optimum yields of the desired products are generally obtained with contact times of from about 3 minutes to about 7 minutes.

The vapors of the trifluoro-trichloro-propene must be diluted with an inert gas for control of the temperatures and the reaction. Suitable inert gases are nitrogen, anhydrous hydrogen fluoride, and the saturated fluorocarbons which are gaseous at the temperatures employed. The term "fluorocarbons" is used in its strict sense to mean compounds consisting of fluorine and carbon. Representative fluorocarbons are: tetrafluoromethane, hexafluoroethane, octafluoropropane, decafluorobutane, octafluorocyclobutane, decafluorocyclopentane, and dodecafluorocyclohexane.

For the purpose of controlling the temperatures and the reaction and causing the reaction to take place smoothly, the concentration of the trifluoro-trichloro-propene in the gaseous mixture should not be greater than about 50% by weight. Gaseous mixtures containing materially less than 3% by weight of the trifluoro-trichloro-propene are inefficient. Usually, the gaseous mixture will contain from about 3% to about 36% by weight of the trifluoro-trichloro-propene with optimum results being obtained at concentrations of from about 25% to about 36% by weight.

Ordinarily, the process will be carried out at substantially atmospheric pressures, i. e., at pressures of from about 1 to about 2 atmospheres absolute. Higher and lower pressures can be employed, but usually without substantial advantage. For example, the pressures may be varied between about ¼ atmosphere to about 5 atmospheres absolute.

In order to more clearly illustrate our invention, preferred modes of carrying the same into effect and the advantageous results to be obtained thereby, the following examples are given:

EXAMPLE I

The cobaltic trifluoride reactor was a pipe, made of Monel, 4 inches in diameter and 32 inches long and contained 3600 grams of powdered $CoF_3$. The powder was stirred so as to continuously expose large fresh surfaces to the vapors passing through the pipe, and from this good contact resulted between the fluorination agent and the vapor of the $CF_3$—$CCl$=$CCl_2$. The $CoF_2$, formed in the fluorination of the $CF_3$—$CCl$=$CCl_2$, could be reconverted to $CoF_3$ with elemental fluorine in the same reactor.

An evaporator, kept at 25° C., was charged with 107 g. $CF_3$—$CCl$=$CCl_2$ (B. P. 88.3° C.). This amount of trifluoro-trichloro-propene was evaporated, over the course of 8 hours, by a current of dry nitrogen bubbling through the propene at the rate of 32 liters per hour. The resulting mixture contained about 1 part of $$CF_3\text{—}CCl\text{=}CCl_2$$

to 1.8 parts of nitrogen by weight or about 35.7% of $CF_3$—$CCl$=$CCl_2$. During these 8 hours, the mixture was passed through the cobaltic trifluoride reactor heated at a controlled temperature of approximately 60° C. Contact time was about 3.6 minutes, since it took this time to completely replace the gas in the free space of the reactor (2 liters) by the inflowing gas-mixture. The products of reaction were scrubbed with aqueous alkaline solution, dried with calcined calcium sulfate, condensed in traps cooled with liquid nitrogen, and fractionated by distillation.

The chief product obtained was the difluoro-addition compound, $CF_3$—$CClF$—$CCl_2F$, 71.5 grams (56% conversion from trifluoro-trichloro-propene), B. P. 73.5° C., $n_D^{20}$=1.3540. As side products, $CF_3$—$CClF$—$CClF_2$ (B. P. 34.7° C.) and $CF_3$—$CClF$—$CF_3$ (B. P. −2° C.) could be isolated in 13.8% and 14.0% conversion, respectively. The $CF_3$—$CClF$—$CF_3$ is useful as a refrigerant, solvent, reaction medium and dielectric material. Altogether, conversion to technically useful products amounted to 83.8%.

EXAMPLE II

The cobaltic trifluoride reactor, used in Example I, was again employed. It contained the same amount of $CoF_3$. The same trifluoro-trichloro-propene was employed and the method of isolating the products of reaction was also the same as in Example I. Conditions of temperature and contact time were, however, different from those in Example I. The evaporator was kept at 35° C. to 40° C., and 123.7 grams trifluoro-trichloro-propene were evaporated in it in the course of 12 hours. The speed of dry nitrogen employed for this evaporation measured only 16 liters per hour. This resulted in a mixture of about 1 part of the trifluoro-trichloro-propene to 2.8 parts of nitrogen by weight or about 26.8% of $CF_3$—$CCl$=$CCl_2$. The temperature of the cobaltic trifluoride reactor, through which the mixture of nitrogen and trifluoro-trichloro-propene was passed during said 12 hours, was kept at 150° C. The contact time was about 7.2 minutes. Stronger fluorination occurred. Less than 4.6 of the original propene was converted to the difluoro-addition compound, 49.6% was converted to $CF_3$—$CClF$—$CClF_2$ (B. P. 34.7° C.) and 10% to $CF_3$—$CClF$—$CF_3$ (B. P. −2° C.).

Altogether, conversion to technically useful products amounted to about 64%.

The effect of varying the temperatures, contact times and concentration of the gases will be more readily apparent from the following table:

Table

| Temp., ° C. | Contact time, min. | Nitrogen, liters/hour | Percent conversion of $CF_3$—$CCl$=$CCl_2$ to — | |
|---|---|---|---|---|
| | | | $CF_3$—$CClF$—$CCl_2F$ | $CF_3$—$CClF$—$CClF_2$ |
| 50–60 | 3.6 | 32 | 56 | 13.8 |
| 70–80 | 3.6 | 32 | 56 | 9.3 |
| 100–115 | 7.2 | 16 | 35.1 | 24.6 |
| 150 | 7.2 | 16 | <4.6 | 49.6 |
| 150 | 3.6 | 32 | 21.5 | 36.8 |

In the course of the work illustrated by the examples and the table, no dimers or other polymeric materials were detected. If any were found in only small amounts, probably less than 5% of the reaction products.

It will be understood that the preceding examples and table are given for illustrative purposes solely and that our invention is not limited to the specific embodiments disclosed therein. The temperatures, contact times, concentrations and other conditions may be varied within the limits hereinbefore set forth and such modifications are embraced within the scope of our invention. Likewise, the apparatus, methods of preparing the gaseous mixtures, and the methods of collecting, purifying and separating the reaction products may be widely varied as is well known to those skilled in the art without departing from the spirit or scope of our invention.

It will be apparent that we have provided a simple, economical, efficient and readily controlled process for producing the very valuable compounds 2:3:3 - trichloropentafluoropropane and 2:3-dichlorohexafluoropropane in greatly improved yields and have avoided the objectionable features of the processes of the prior art. Accordingly, it is apparent that our invention constitutes a valuable contribution and advance in the art.

We claim:

1. The process for preparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 3% to about 50% by weight of the trifluoro-trichloro-propene, over powdered $CoF_3$ heated at a temperature of from about 50° C. to about 150° C. at a contact time of from about 1 to about 10 minutes, while stirring the powdered $CoF_3$ to continuously expose fresh surfaces thereof to the mixture of gases and then separating the products.

2. The process for preparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 3% to about 36% by weight of the trifluoro-trichloro-propene, over powdered $CoF_3$ heated at a temperature of from about 50° C. to about 150° C. at a contact time of from about 1 to about 10 minutes, while stirring the powdered $CoF_3$ to continuously expose fresh surfaces thereof to the mixture of gases and then separating the products.

3. The process for preparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 3% to about 36% by weight of the trifluoro-trichloro-propene, over powdered $CoF_3$ heated at a temperature of from about 50° C. to about 150° C. at a contact time of from about 3 to about 7 minutes, while stirring the powdered $CoF_3$ to continuously expose fresh surfaces thereof to the mixture of gases and then separating the products.

4. The process for preparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 25% to about 36% by weight of the trifluoro-trichloro-propene, over powdered $CoF_3$ heated at a temperature of from about 50° C. to about 150° C. at a contact time of from about 3 to about 7 minutes, while stirring the powdered $CoF_3$ to continuously expose fresh surfaces thereof to the mixture of gases and then separating the products.

5. The process for preparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 3% to about 50% by weight of the trifluoro-trichloro-propene, over powdered $CoF_3$ heated at a temperature of from about 50° C. to about 115° C. at a contact time of from about 1 to about 10 minutes, while stirring the powdered $CoF_3$ to continuously expose fresh surfaces thereof to the mixture of gases and then separating the products.

6. The process for preparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 3% to about 36% by weight of the trifluoro-trichloro-propene, over powdered $CoF_3$ heated at a temperature of from about 50° C. to about 115° C. at a contact time of from about 1 to about 10 minutes, while stirring the powdered $CoF_3$ to continuously expose fresh surfaces thereof to the mixture of gases and then separating the products.

7. The process for perparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 25% to about 36% by weight of the trifluoro-trichloro-propene, over powdered $CoF_3$ heated at a temperature of from about 50° C. to about 115° C. at a contact time of from about 3 to about 7 minutes, while stirring the powdered $CoF_3$ to continuously expose fresh surfaces thereof to the mixture of gases and then separating the products.

8. The process for preparing at least one of 2:3:3-trichloropentafluoropropane and 2:3-dichlorohexafluoropropane which comprises passing a mixture of vapors of 1:1:1-trifluoro-2:3:3-trichloro-2-propene and an inert gas, the mixture containing from about 25% to about 36% by weight of the trifluoro-trichloro-propene, over powdered $CoF_3$ heated at a temperature of from about 50° C. to about 80° C. at a contact time of from about 3 to about 7 minutes, while stirring the powdered $CoF_3$ to continuously expose fresh surfaces thereof to the mixture of gases and then separating the products.

HANS B. GOTTLIEB.
JOSEPH D. PARK.

References Cited in the file of this patent

UNITED STATES PATENTS

| Number | Name | Date |
| --- | --- | --- |
| 2,436,357 | Gochenour et al. | Feb. 17, 1948 |
| 2,541,190 | Benning | Feb. 13, 1951 |
| 2,554,857 | Gochenour | May 29, 1951 |

FOREIGN PATENTS

| Number | Country | Date |
| --- | --- | --- |
| 559,080 | Great Britain | Feb. 3, 1944 |

OTHER REFERENCES

McBee et al.: Ind. and Eng. Chem., vol. 39, No. 3, pages 310–312, March 1947.